(12) United States Patent
Subramanian et al.

(10) Patent No.: US 7,697,524 B2
(45) Date of Patent: Apr. 13, 2010

(54) METHOD AND SYSTEM FOR DETERMINING PATH MAXIMUM TRANSFER UNIT FOR IP MULTICAST

(75) Inventors: Srinivas Subramanian, San Jose, CA (US); Anand Jayaraman, Chennai (IN); Balaji Venkat Venkataswami, Chennai (IN)

(73) Assignee: Cisco Technology, Inc., San Jose, CA (US)

(*) Notice: Subject to any disclaimer, the term of this patent is extended or adjusted under 35 U.S.C. 154(b) by 860 days.

(21) Appl. No.: 11/099,787

(22) Filed: Apr. 5, 2005

(65) Prior Publication Data

US 2006/0221844 A1  Oct. 5, 2006

(51) Int. Cl.
*H04L 12/56* (2006.01)
(52) U.S. Cl. ........................... 370/390; 370/432
(58) Field of Classification Search .............. 370/389, 370/400, 218, 252, 229, 235, 392, 477, 466, 370/390, 432; 709/234, 224, 238, 230
See application file for complete search history.

(56) References Cited

U.S. PATENT DOCUMENTS

| | | | | |
|---|---|---|---|---|
| 6,212,190 | B1* | 4/2001 | Mulligan | 370/400 |
| 6,975,647 | B2* | 12/2005 | Neale et al. | 370/466 |
| 7,103,674 | B2* | 9/2006 | Brown et al. | 709/234 |
| 7,302,491 | B2* | 11/2007 | Brown et al. | 709/236 |
| 7,304,959 | B1* | 12/2007 | Swaroop et al. | 370/252 |
| 7,317,692 | B2* | 1/2008 | Jason et al. | 370/252 |
| 7,451,227 | B2* | 11/2008 | Lee et al. | 709/232 |
| 7,505,484 | B2* | 3/2009 | Pancholi et al. | 370/470 |
| 7,542,471 | B2* | 6/2009 | Samuels et al. | 370/392 |
| 2002/0003775 | A1* | 1/2002 | Nakano et al. | 370/218 |
| 2003/0110276 | A1* | 6/2003 | Riddle | 709/230 |
| 2003/0145233 | A1* | 7/2003 | Poletto et al. | 713/201 |
| 2003/0185208 | A1* | 10/2003 | Lee et al. | 370/389 |
| 2003/0187975 | A1* | 10/2003 | Brown et al. | 709/224 |
| 2003/0188015 | A1* | 10/2003 | Lee et al. | 709/238 |
| 2004/0090922 | A1* | 5/2004 | Jason et al. | 370/252 |
| 2005/0005024 | A1* | 1/2005 | Samuels et al. | 709/238 |
| 2005/0041635 | A1* | 2/2005 | Chung et al. | 370/351 |
| 2005/0058131 | A1* | 3/2005 | Samuels et al. | 370/389 |
| 2005/0060426 | A1* | 3/2005 | Samuels et al. | 709/238 |

(Continued)

FOREIGN PATENT DOCUMENTS

WO   WO 03/084145 A1   10/2003

OTHER PUBLICATIONS

Authors: J. McCann, S. Deering, J. Mogul RFC-1981; Path MTU Discovery for IP Version 6 Aug. 1996 pp. 1-15.*

(Continued)

*Primary Examiner*—Salman Ahmed
(74) *Attorney, Agent, or Firm*—Trellis IP Law Group, PLC

(57) ABSTRACT

A method and system for determining path maximum transfer unit (PMTU) in an Internet Protocol (IP) multicast is described. If a packet of a size greater than the MTU of any link of a path, with its Don't Fragment (DF) bit set, is sent by the source, the packet is dropped and an ICMP message, stating "Destination unreachable, DF bit set", is sent to the source. The rate of messages to the source is controlled to avoid implosion of traffic. In response to the messages, the source sends multicast probe packets of multiple sizes to multicast distribution tree to determine its PMTU.

20 Claims, 9 Drawing Sheets

U.S. PATENT DOCUMENTS

| | | | |
|---|---|---|---|
| 2005/0063302 A1* | 3/2005 | Samuels et al. | 370/229 |
| 2005/0063303 A1* | 3/2005 | Samuels et al. | 370/229 |
| 2005/0063307 A1* | 3/2005 | Samuels et al. | 370/235 |
| 2005/0074007 A1* | 4/2005 | Samuels et al. | 370/392 |
| 2005/0281288 A1* | 12/2005 | Banerjee et al. | 370/477 |
| 2006/0018315 A1* | 1/2006 | Baratakke et al. | 370/389 |
| 2006/0045131 A1* | 3/2006 | Pancholi et al. | 370/472 |
| 2006/0221844 A1* | 10/2006 | Subramanian et al. | 370/248 |
| 2007/0143598 A1* | 6/2007 | Partridge et al. | 713/160 |
| 2008/0165775 A1* | 7/2008 | Das et al. | 370/392 |
| 2009/0003241 A1* | 1/2009 | Teng | 370/254 |

OTHER PUBLICATIONS

IPv6-in-IPv4 Tunnel Discovery: Methods and Experimental Results; Colitti, L. Di Battista, G. Patrignani, M.; Roma Tre University; this paper appears in: Network and Service Management, IEEE Transactions on Publication Date: Apr. 2004 vol. 1, Issue: 1 On pp. 30-38.*

Packet-dispersion techniques and a capacity-estimation methodology; Dovrolis, C. Ramanathan, P. Moore, D. Coll. of Comput., Georgia Inst. of Technol., Atlanta, GA, USA; This paper appears in: Networking, IEEE/ACM Transactions on Publication Date: Dec. 2004 vol. 12, Issue: 6 On pp. 963-977.*

RFC2923: TCP Problems with Path MTU Discovery; United States; Year of Publication: 2000; Author K. Lahey.*

* cited by examiner

METHOD AND SYSTEM FOR DETERMINING PATH MAXIMUM TRANSFER UNIT FOR IP MULTICAST

BACKGROUND OF THE INVENTION

1. Field of Invention

This invention relates in general to the field of Internet Protocol (IP) multicast. More specifically, the invention relates to methods and systems for determining Path Maximum Transfer Units (PMTU) in an IP multicast.

2. Description of the Background Art

An Internet Protocol (IP) multicast is a network comprising a source and a plurality of destinations. Source is a network node from which data is transferred to one or more destinations. In a network, the source and destinations are connected to each other via a series of paths. The path includes one or more router. For example, a source A may be connected via a path to a router B. The router B may be connected to another router C. The router C is then connected to three destinations—D, E and F.

A packet is transmitted by a path in the network only if the size of the packet is less than or equal to the Maximum Transfer Unit (MTU) of the path If the size of the packet is larger than the MTU of the path, the router fragments the packet. However, fragmentation of packets at routers is not preferred since it affects the performance of the network In an IP multicast, fragmentation affects the performance of the node carrying out the fragmentation and the destinations receiving the fragmented packets. To prevent fragmentation, a Don't Fragment (DF) bit is set on the packets.

When a router is unable to transmit a packet because its size exceeds the MTU of the path and its DF bit is set, the router sends back a message to the source, stating 'Destination Unreachable, DF bit set'. The message is sent using Internet Control Message Protocol (ICMP) and the message is called 'Packet too BIG' ICMP message. The router sending the message also includes the MTU of the path on which the fragmentation failed. In response to the 'Packet too BIG' ICMP message, the source starts transmitting the packet of a smaller size. Usually the size of the packet is taken to be equal to the MTU received in the 'Packet too BIG' ICMP message.

However, if a packet transmitted by the source is destined for a plurality of destinations, such as in an IP multicast, the message is not sent back to the source. This is to avoid an implosion of traffic at the source. The packets are simply dropped, i.e., they are not sent to the destination devices. This prevents the source from modifying the size of the packet, to ensure that subsequent packets are of a size that is smaller than the MTU of the path.

DETAILED DESCRIPTION OF EMBODIMENTS OF THE INVENTION

The invention provides a method, a system, and a computer program product for determining Path Maximum Transmission Unit (PMTU) in an Internet protocol (IP) multicast. In a network system, such as an IP multicast, the maximum size of a packet that can be transferred through a path without fragmentation on any branch of the multicast tree is called the Maximum Transfer Unit (MTU) of the path or PMTU. In a network system, if a packet is sent by a source device to a single destination device, and the size of the packet is greater than the PMTU, and its 'Don't Fragment' (DF) bit is set, the packet is dropped. In response, a message is sent to the source device, stating 'Destination Unreachable, DF bit set'. The message is sent using Internet Control Message Protocol (ICMP) and the message is called "Packet too BIG" ICMP message. The "Packet too BIG" ICMP message also includes the MTU of the path on which the fragmentation failed. Thereafter, the source device sends packets of a smaller size to that path in the network. However, in the case of an IP multicast, one source device sends packets to a plurality of destination devices. If a packet is dropped, the source device is not sent any message. This is done to avoid an implosion of messages at the source device. Hence, in an IP multicast, the source device gets no information about the dropped packet, and therefore, no corrective action is taken. To overcome this problem, the invention provides a method and a system for sending the message to the source device in an IP multicast, in case a packet, of a size that is greater than the PMTU, with DF bit set, is dropped.

Figure 1:
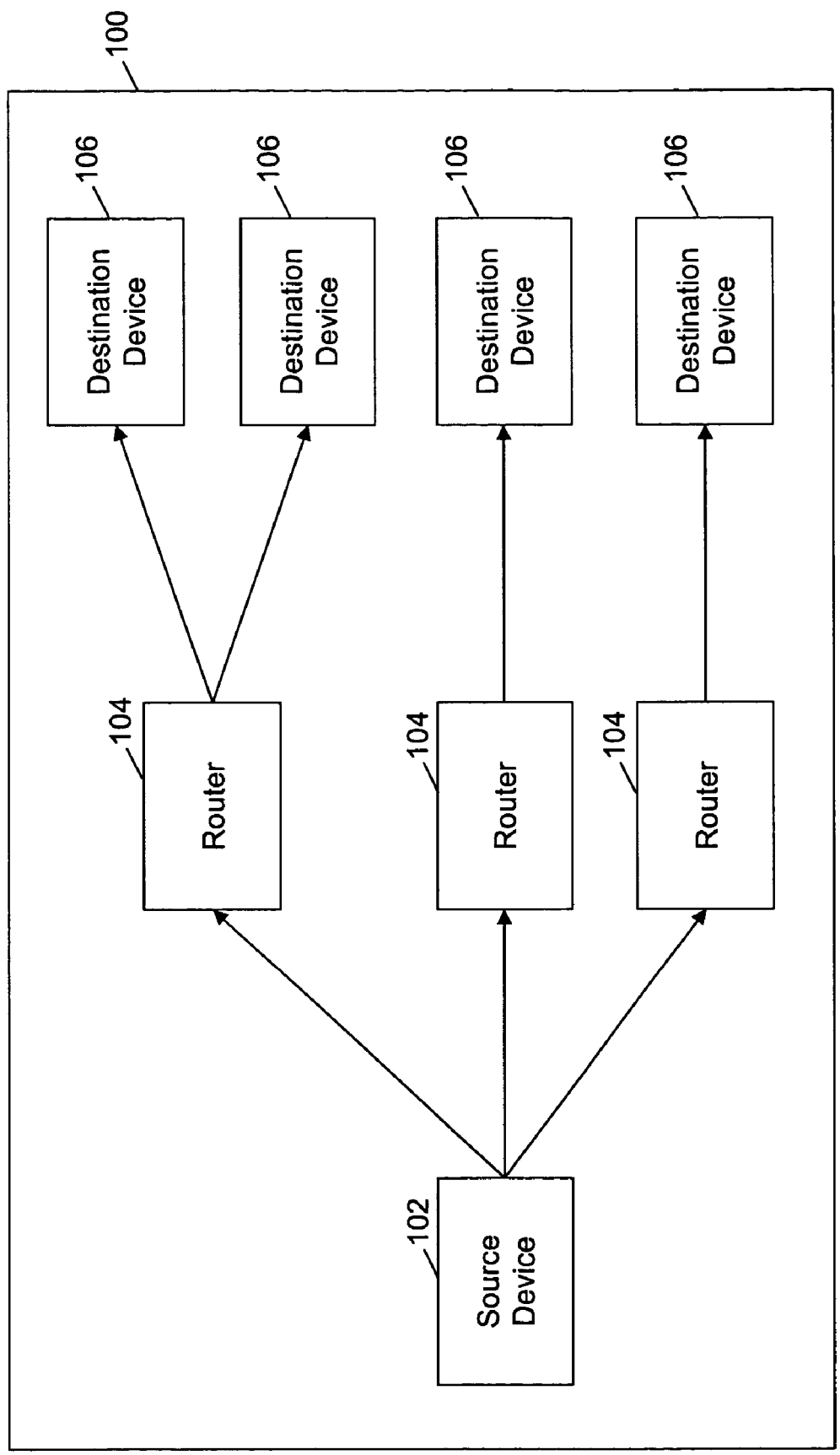
FIG. 1 illustrates an exemplary environment wherein the present invention can be practiced, in accordance with an embodiment of the invention.

FIG. 1 illustrates an exemplary environment wherein the present invention can be practiced, in accordance with an embodiment of the invention. The environment includes an IP multicast network 100. IP multicast network 100 includes a source device 102, at least one router 104, and at least one destination device 106. Source device 102 is a node in IP multicast network 100 that sends packets to destination devices 106. Destination devices 106 are linked to source devices 102 through one or more routers 104. Routers 104 are intermediate nodes in IP multicast network 100 that provide routing between destination device 106 and source device 102. For example, a destination device A may be linked to a source device S through the following path: source device S linked to router B, router B linked to router C, and router C linked to the destination devices A and D. A multicast distribution tree is a sub-set of IP multicast network 100, that comprises a set of paths, from source device 102 to destination devices 106, along which a packet is delivered to destination devices 106. Each multicast distribution tree is represented by a multicast group address. A packet sent to a multicast group address is sent to all destination devices 106 that are part of the corresponding multicast distribution tree.

In an exemplary embodiment of the invention, source device 102 and destination devices 106 can be general-purpose computers. Source device 102 transmits a packet to a router 104 of the multicast distribution tree to which the packet is to be delivered. Router 104 replicates the packet depending on the number of destination devices 106 to which the packet is to be transmitted. Router 104 transmits the replicated packets to destination devices 106. For a successful transfer of packets (without fragmentation) from the source device 102 to destination device 106, the size of the packets should be less than or equal to the minimum MTU of all the paths. In case the packets are larger than the MTU of any path between destination device 106 and source device 102, and the DF bit is set, the packets are dropped. Therefore, the MTU of the entire multicast distribution tree between source device 102 and destination devices 106 is equal to the MTU of the path that has the minimum MTU value.

For transferring a packet along a path in the multicast distribution tree without fragmentation, the size of the packet should be less than or equal to minimum MTU of all the paths or the PMTU. In case the packet is larger in size than the PMTU, and the Don't Fragment (DF) bit in the packet header is set, the packet is dropped from the path. Further, source device 102 is informed that the packet cannot be transmitted via the path.

Figure 2:
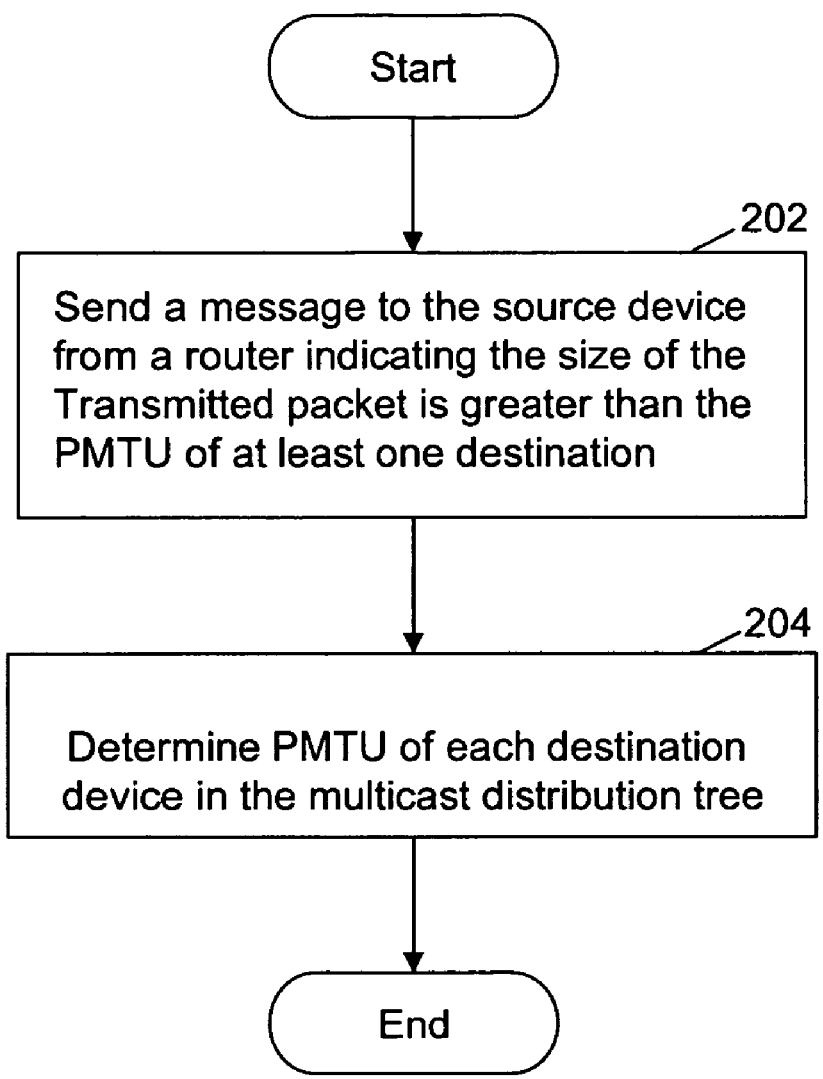
FIG. 2 is a flowchart depicting a method for determining path MTU for an internet protocol multicast, in accordance with an embodiment of the invention.

FIG. 2 is a flowchart depicting a method for determining path MTU for an IP multicast, in accordance with an embodiment of the invention. At step 201, and as will be discussed in more detail below with reference to FIGS. 3a-3c, a rate for message generation from intermediate nodes or routers 104 coupled between source device 102 and destination devices 106 may be controlled (e.g., limited). At step 202, if a packet sent by source device 102 is larger in size than the MTU of any link of a path (e.g., a first path), and the DF bit in the packet is set (e.g., by source device 102), the packet is dropped and a message is sent by router 104 to source device 102. The message informs source device 102 that the PMTU is smaller than the size of the packet. For example, router 104 supplying the message may be in a first path, while such a message may be suppressed and the packet dropped in a second path, as will be discussed in more detail below. At step 204, in response to the message, the PMTU of the multicast distribution tree (e.g., including the first and second paths) is determined. In another embodiment of the invention, the method for PMTU discovery is performed periodically. In an embodiment of the invention, the size of the packets to be sent to destination devices can be increased based on the identified PMTU. The above steps are illustrated in detail, in conjunction with FIGS. 3a-3c. Hereinafter, the invention is discussed in accordance with an embodiment in which the message is an ICMP message.

Figure 3A:
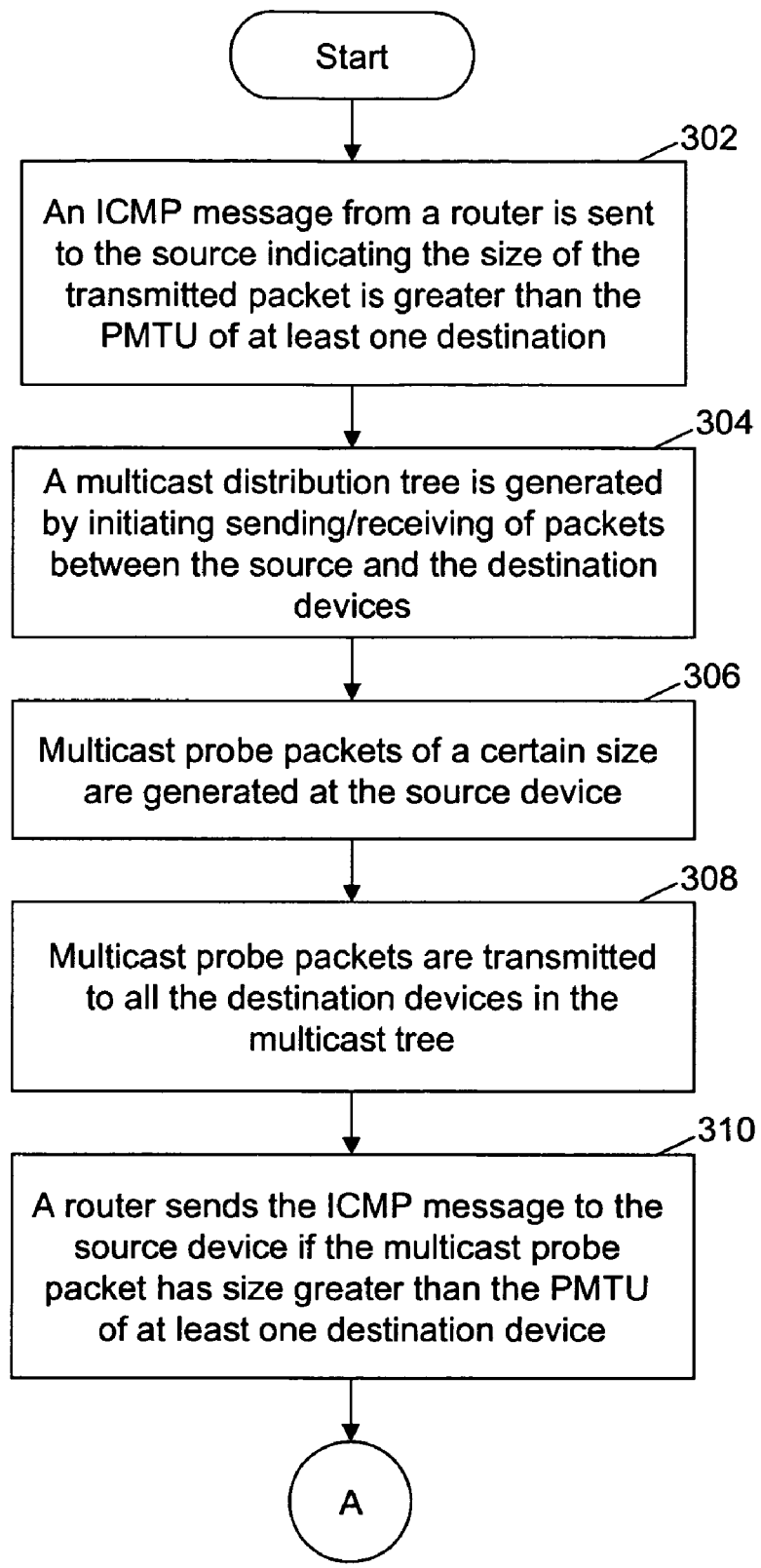
FIGS. 3a-3c is a detailed flowchart depicting the method for determining path MTU for an Internet protocol multicast, in accordance with an embodiment of the present invention.
Figure 3B:
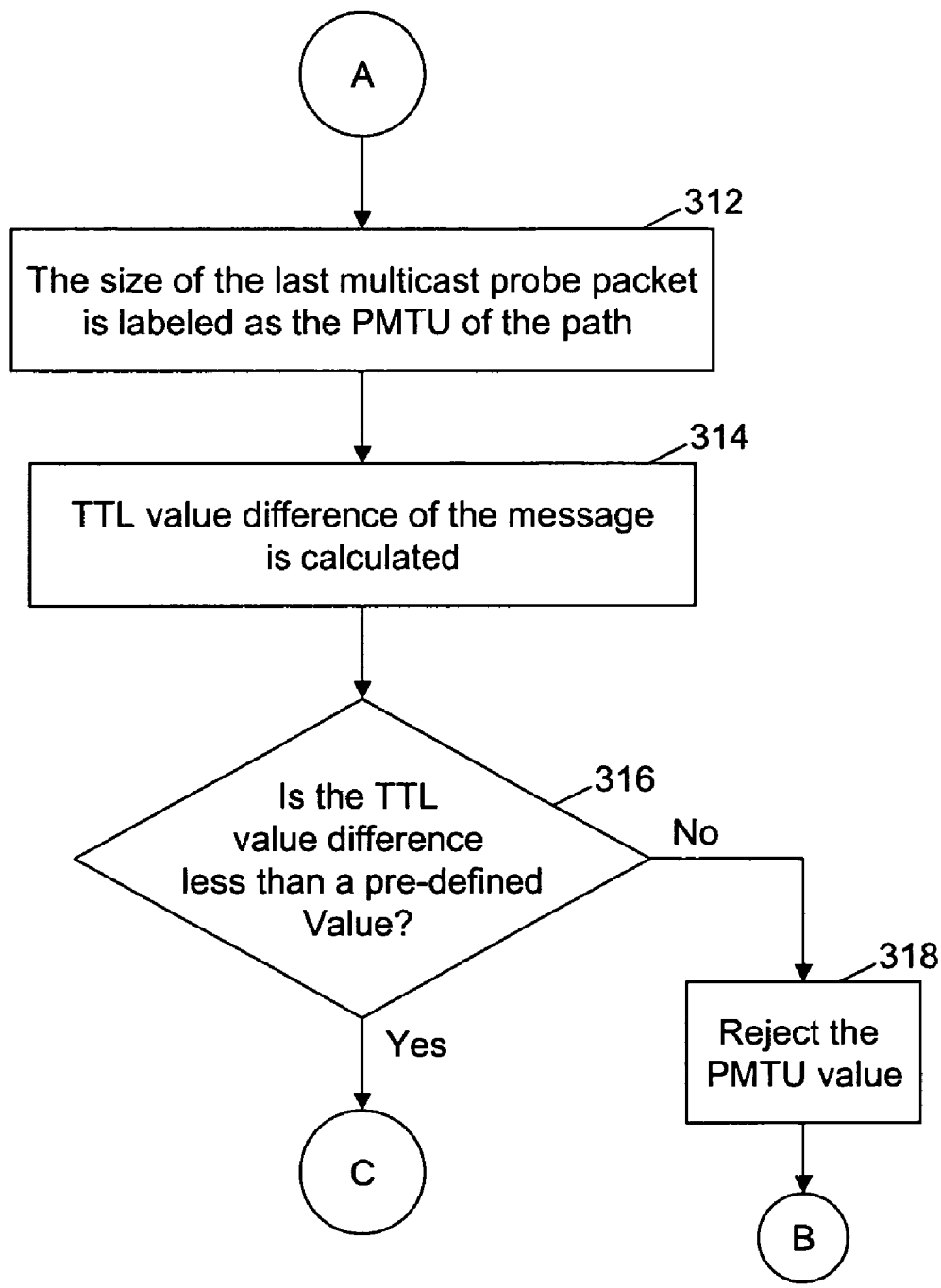
Figure 3C:
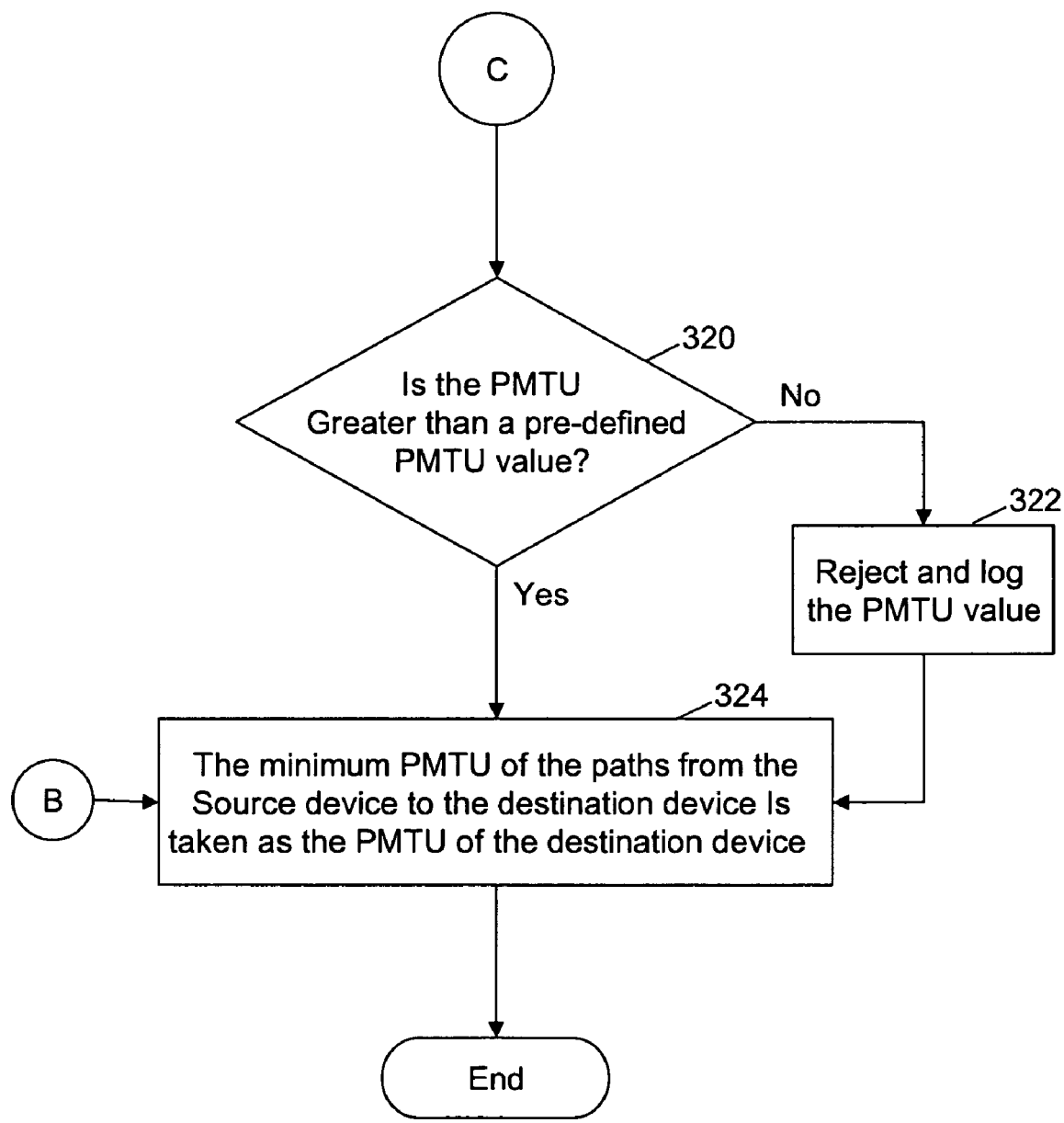

FIGS. 3a-3c is a detailed flowchart depicting a method for path MTU discovery, in accordance with an embodiment of the present invention. At step 302, if a packet sent by source device 102 is larger in size than the MTU of any link along a path, and its DF bit is set, the packet is dropped and an ICMP message is sent to source device 102. The ICMP message also includes the MTU of a link along the path on which the fragmentation failed. However, in IP multicast network 100, there may be a plurality of destination devices 106. Therefore, a packet that is larger in size than the PMTU of a plurality of destination devices 106 may lead to an implosion of ICMP messages at source device 102. The implosion of ICMP messages affects the performance of source device 102, since each ICMP message occupies certain bandwidth and memory. Therefore, the rate at which the ICMP messages are generated is limited to only a pre-defined rate. In an embodiment of the invention, the ICMP messages are sent at a rate of one message per minute. Since the generation rate of ICMP messages is controlled, there are some paths for which the ICMP messages are not generated. For such paths, the packets are silently dropped. Controlling the rate of ICMP messages and, therefore, dropping some packets silently avoids implosion of traffic at source device 102. In another embodiment of the invention, the ICMP message is generated only if a particular path has been forwarding multicast traffic at a pre-defined rate. This avoids Distributed Reflection Denial of Service (DRDOS) attack at source device 102.

At step 304, multicast probe packets of a certain size are generated at source device 102. Multicast probe packets are duplicate packets sent from source device 102, of a certain size, with a DF bit set, so that they can be transmitted with regular traffic in the multicast distribution tree, to determine the PMTU of the multicast distribution tree. The size of these multicast probe packets is less than the size of the previously sent packet for which ICMP messages had been generated. In one embodiment of the invention, the size of the multicast probe packets is same as the MTU of the path on which the fragmentation failed.

At step 306, the multicast probe packets are transmitted to the multicast distribution tree. These multicast probe packets can be sent with regular traffic of the multicast distribution tree. At step 308, if the size of the multicast probe packet is larger than the PMTU at any link in the path, the multicast probe packet is dropped and the ICMP message is generated in the same manner as in step 302. This process is repeated till no ICMP message is generated in response to multicast probe packets. Consequently, at step 310, the size of the multicast probe packets for which the ICMP message is not received is labeled as PMTU for the path. To summarize, source device 102 keeps generating multicast probe messages of a smaller size for the multicast distribution tree, till the size of the multicast probe messages become less than or equal to the PMTU, so that the ICMP message is not generated. The size of the first multicast probe message that does not generate the ICMP message gets labeled as the PMTU of the path.

Time-to-live (TTL) value differences of the ICMP messages are calculated at step 312, once the PMTU has been discovered by source device 102. The TTL value difference is a hop count measure of the ICMP message received at source device 102 from router 104. The hop counts are the number of links traversed by the ICMP message before reaching source device 102. A high TTL value difference indicates that router 104 generating the ICMP message is far away from source device 102. The distance of router 104 under consideration is not the spatial distance but is based upon the number of nodes that lie between source device 102 and router 104. A high TTL value difference therefore indicates that the number of nodes lying between router 104, i.e., the router generating the ICMP message, and source device 102 is large. Therefore, a high TTL value difference generally indicates that router 104 is far away from source device 102. This implies router 104 has small number of destination devices 104 downstream of the multicast distribution tree.

At step 314, the TTL value difference of router 104 is compared with a pre-defined value. At step 316, if the TTL value difference is greater than the pre-defined value, the labeled PMTU value of router 104 is rejected. The basis of this step is as follows: if the TTL value difference is more than the pre-defined value, this implies that router 104 is far away from source device 102. This implies router 104 has small number of destination devices 104 downstream of the multicast distribution tree. In this case, the size of the packets at source device 102 is not reduced, since only a small number of destination devices 106 are affected. Whereas, with larger packet size, a larger data transfer speed may be achieved for the rest of destination devices 106 in the IP multicast.

At step 318, if the TTL value difference of router 104 is less than the pre-defined value, the labeled PMTU is compared with a pre-defined PMTU value. At step 320, if the PMTU value is less than the pre-defined PMTU value, the PMTU value is rejected and logged for future reference. The basis of this step is as follows: if the PMTU value of a multicast distribution tree is substantially smaller than the predefined PMTU value, source device 102 sends packets of a very small size to the multicast distribution tree. Therefore, all the paths in the multicast distribution tree receive packets of a small size. This may affect the network data transfer speed. Hence, a PMTU value that is lower than a pre-defined PMTU value is rejected and logged. The logged PMTU value can be referred to, and the problem with that part of the IP multicast can be rectified later.

At step 322 the minimum PMTU among the paths of the multicast distribution tree is taken as the PMTU of the multicast distribution tree.

Figure 4:
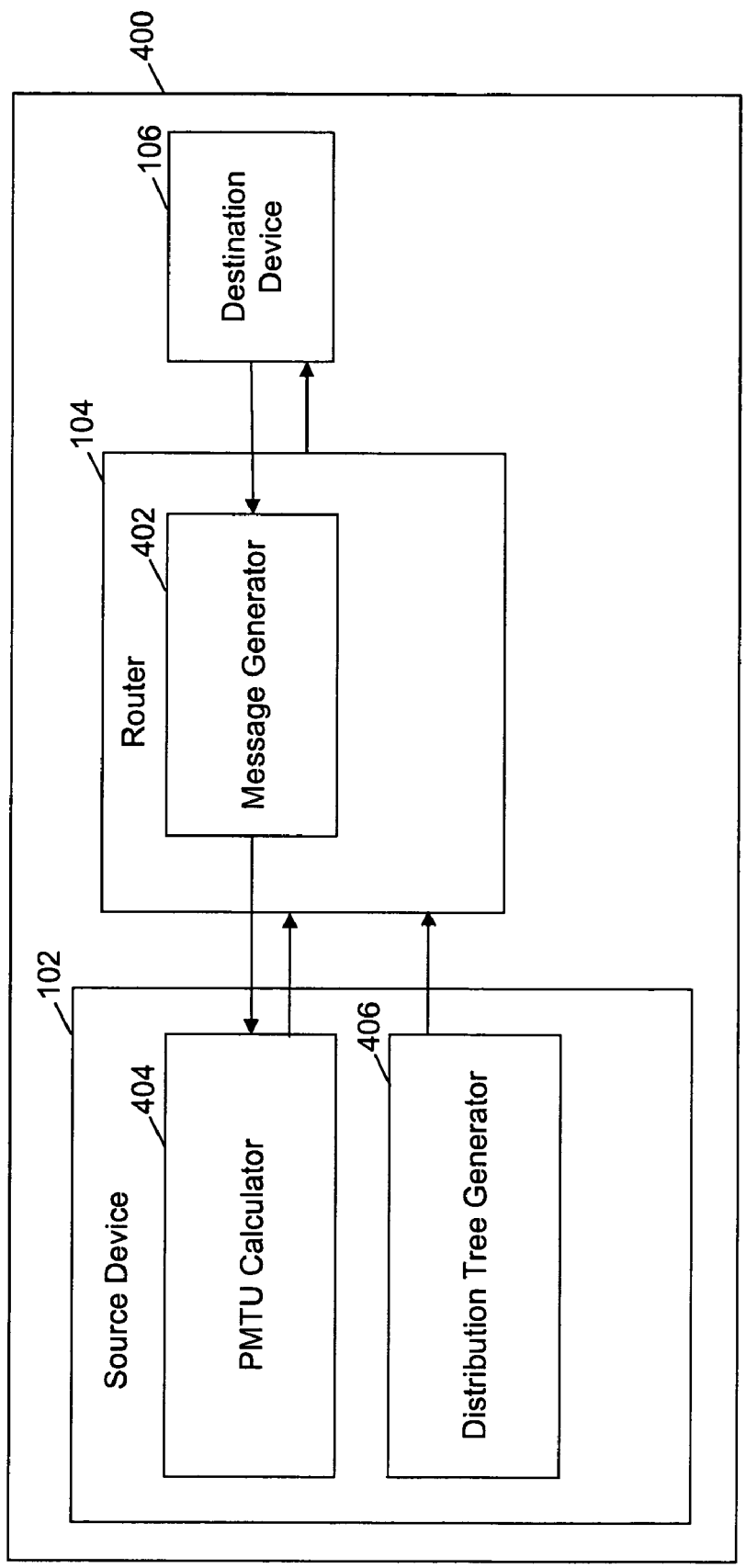
FIG. 4 illustrates a system for path MTU discovery, in accordance with an exemplary embodiment of the present invention.

FIG. 4 illustrates a system 400 for path MTU discovery, in accordance with an exemplary embodiment of the present invention. System 400 includes a message generator 402, and a PMTU calculator 404. In an embodiment of the invention, message generator 402 is located within router 104. In an embodiment of the invention, PMTU calculator 404 is located within source device 102. When the size of a packet, to be transmitted by source device 102, has a size greater than the PMTU of any link in a path in the multicast distribution tree, and its DF bit is set, the packet is dropped. In response to this, message generator 402 at router 104 generates a message stating 'Destination Unreachable, DF bit set'. The message is sent to source device 102. The message informs source device 102 that the size of the packet is larger than the PMTU. The message also includes the MTU of the link of the path where the packet was dropped. In the embodiment of the invention described herein, the message is an ICMP message. In response to the ICMP message, PMTU calculator 404 determines the PMTU of the multicast distribution tree. In an embodiment of the invention, the system elements described above can be enabled as software modules. The system elements of the present invention are discussed in detail later in conjunction with the FIGS. 5, 6 and 7.

Figure 5:
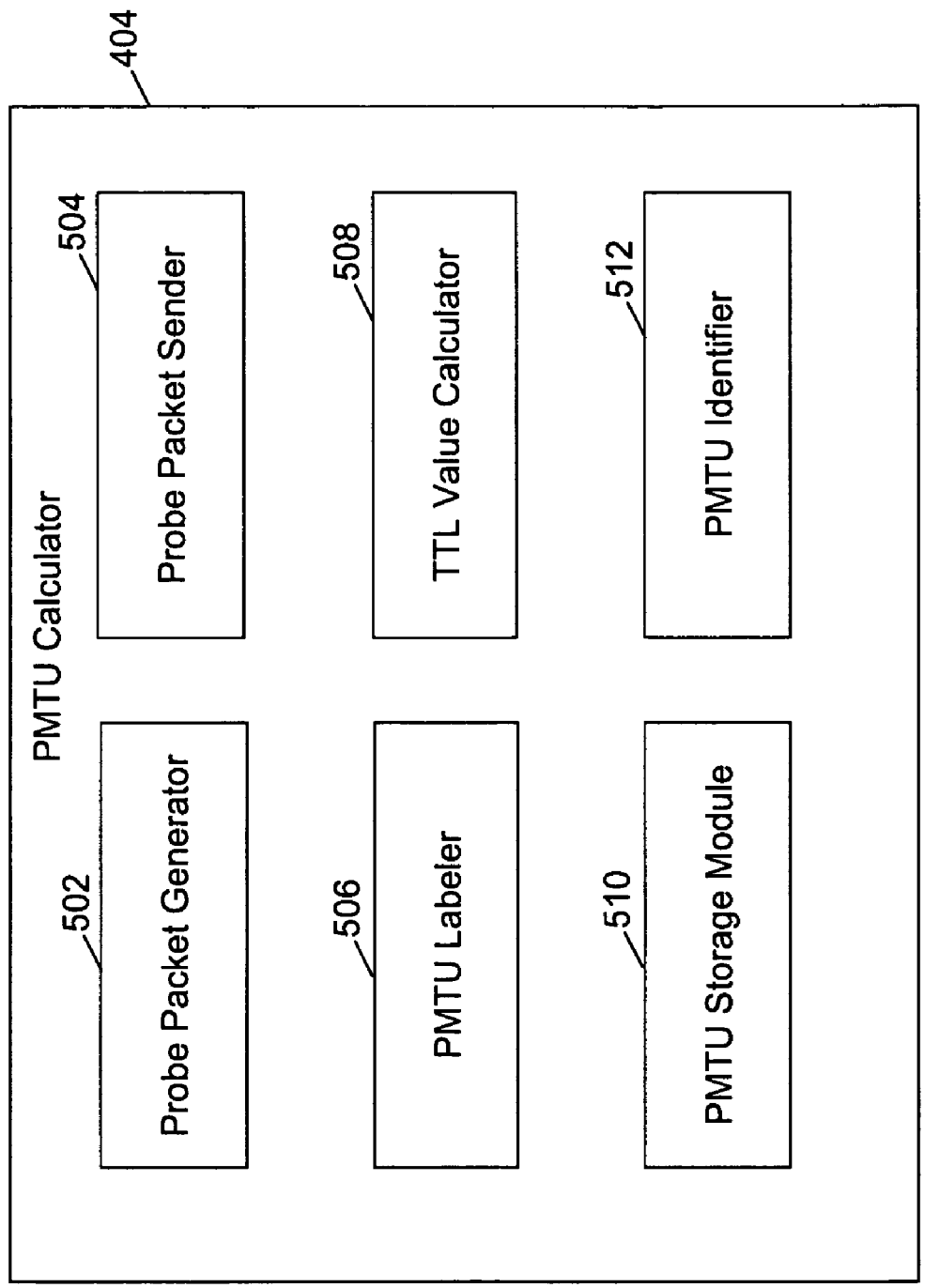
FIG. 5 illustrates a PMTU calculator, in accordance with an exemplary embodiment of the present invention.

FIG. 5 illustrates the system elements of PMTU calculator 404, in accordance with an embodiment of the invention. PMTU calculator 404 includes a probe packet generator 502, a probe packet sender 504, a PMTU labeler 506, a TTL value calculator 508, a PMTU storage module 510 and a PMTU identifier 512. Probe packet generator 502 generates multicast probe packets. The multicast probe packet is a duplicate packet of a certain size, with the DF bit set, so that it can be transmitted with regular traffic in the multicast distribution tree, to determine the PMTU of the multicast distribution tree. In one embodiment of the invention, the size of the multicast probe packets is same as the size of the MTU value included in the ICMP message. Probe packet sender 504 transmits the multicast probe packet to all destination devices 106 in the multicast distribution tree along with regular traffic of packets. If the size of the multicast probe packet is larger than the MTU of any link in a path in the multicast distribution tree, the multicast probe packet is dropped and message generator 402 at router 104 sends the ICMP message to source device 102. The function of message generator 402, with its system elements, is discussed in detail in conjunction with FIG. 6. PMTU labeler 506, TTL value calculator 508, PMTU storage module 510 and PMTU identifier 512 have different functionalities in processing the ICMP messages. Their individual roles are discussed in detail after illustrating the role of message generator 402.

Figure 6:
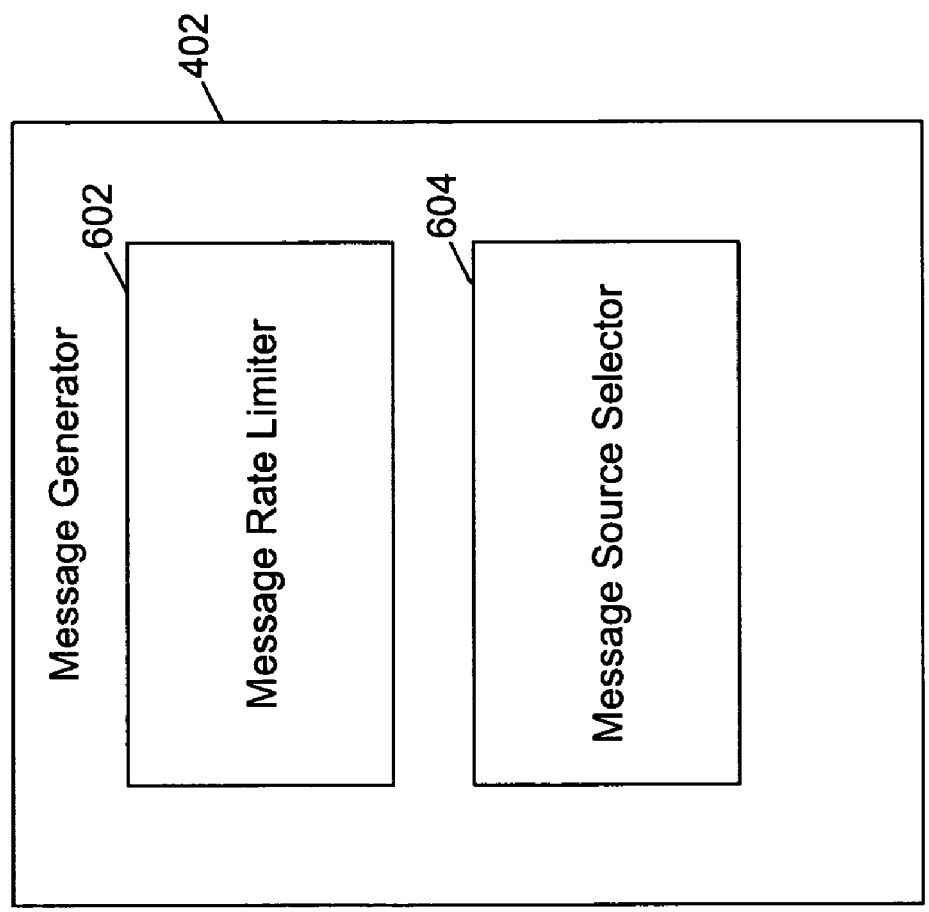
FIG. 6 illustrates a message generator, in accordance with an exemplary embodiment of the present invention.

FIG. 6 illustrates the system elements of message generator 402, in accordance with an exemplary embodiment of the present invention. Message generator 402 includes a message rate limiter 602 and a message source selector 604. Message generator 402 generates an ICMP message when a multicast probe packet is dropped in a link of a path in the multicast distribution tree. However, in the multicast distribution tree, a packet with size larger than the PMTU of a plurality of destination devices 106 may lead to an implosion of ICMP messages at source device 102. The implosion of ICMP messages affects the performance of source device 102, since each ICMP message occupies certain bandwidth and memory. Therefore, message rate limiter 602 limits the rate of the generation of ICMP messages to less than a pre-defined rate. The multicast probe packets are silently dropped for the paths for which an ICMP message is not generated. In an embodiment of the invention, message source selector 604 ensures that the ICMP message is generated only if a particular path has been forwarding regular traffic at a pre-defined rate. This avoids a Distributed Reflection Denial of Service (DRDOS) attack at source device 102.

On receiving the ICMP message, in response to a multicast probe packet sent to the multicast distribution tree, probe packet generator 502 generates a multicast probe packet of a smaller size. This multicast probe packet is transmitted by probe packet sender 504 to the multicast distribution tree. In this manner, probe packet generator 502 keeps generating multicast probe packets of a smaller size till it stops receiving the ICMP message. PMTU labeler 506 labels the size of the first multicast probe packet that does not generate an ICMP message as the PMTU of that path. TTL value calculator 508 calculates the TTL value difference of the ICMP message. Based on the TTL values determined by TTL value calculator 508, source device 102 decides the size of subsequent packets to be sent to the multicast distribution tree. The method for the same has been described earlier in conjunction with FIG. 2.

Figure 7:
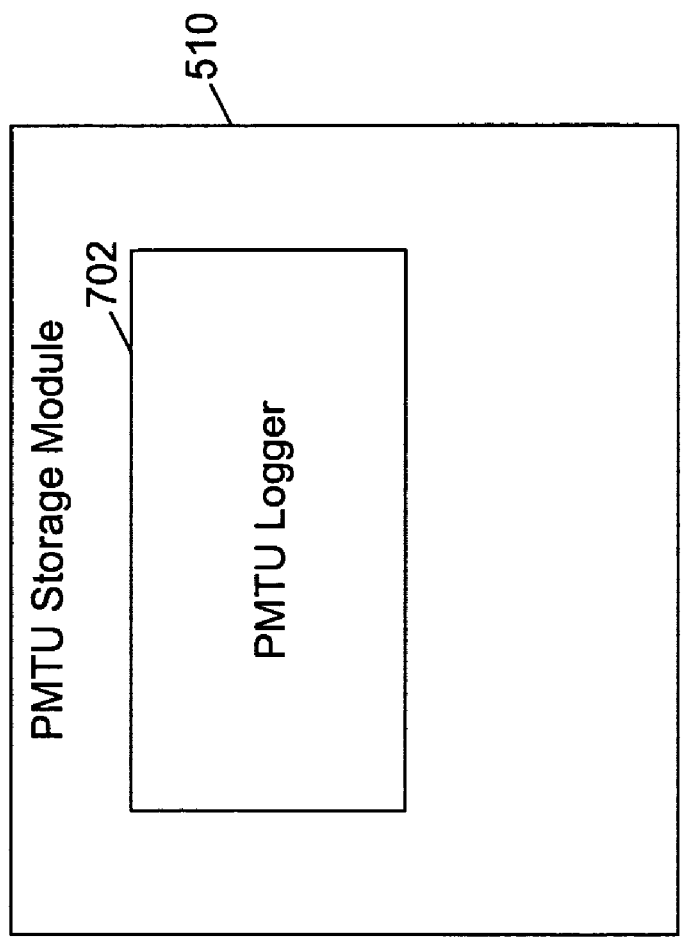
FIG. 7 illustrates a PMTU storage module, in accordance with an exemplary embodiment of the present invention.

FIG. 7 illustrates the system element of PMTU storage module 510, in accordance with an exemplary embodiment of the present invention. The PMTU storage module includes a PMTU logger 702. PMTU storage module 510 compares the TTL value difference of router 104 with a pre-defined value.

If the TTL value difference is greater than the pre-defined value, it means that router 104 is far away from source device 102. In such a case, the labeled PMTU value of the path is rejected for the calculation of the PMTU of the multicast distribution tree. As a result, the various embodiments of the invention eliminate cases wherein small packet sizes are sent because of a bottleneck arising close to the destination device. Therefore, the size of the packets transmitted to the multicast distribution tree is not reduced, since only a small number of destination devices 106 are likely to get affected. Whereas, with a larger packet size, a higher overall data transfer speed can be achieved. If the TTL value difference of the ICMP message is less than the pre-defined value, the labeled PMTU corresponding to router 104 is compared with a pre-defined PMTU value. If the labeled PMTU value is less than the pre-defined PMTU value, then the labeled PMTU value is rejected for the calculation of the PMTU of the multicast distribution tree. If the labeled PMTU value is less than the pre-defined PMTU value, the size of the packets, which can be transmitted by the path, is small. Therefore, the other paths in the multicast distribution tree would also receive packets of smaller size. This affects network data transfer speed. Hence, the PMTU storage module 510 rejects the PMTU value that is lower than the pre-defined PMTU value.

PMTU logger 702 logs the rejected PMTU value for future reference. The logged PMTU value can be referred to and rectified later. PMTU identifier 512 identifies the minimum PMTU of the paths for the multicast distribution tree. The minimum PMTU is taken as the PMTU of the multicast distribution tree. In an embodiment of the invention, the system element described above can be enabled as software modules.

Embodiments of the present invention have the advantage that source device 102, in an IP multicast, gets the message in case a particular packet, with DF bit set, has not been transmitted to a destination device 106 because it has a smaller PMTU than the size of the packet.

Another advantage provided by the invention is that there is no implosion of messages at source device 102 because the rate of generation of messages is restricted at router 104.

Further, larger MTU paths can also be detected by source device 102, since it sends multicast probe packets of varying sizes. Source device 102 can send the multicast probe packets periodically, thereby detecting dynamic changes in MTU values in the IP multicast.

The invention can be implemented on the existing IP multicasts by making minor changes in source device 102 and routers 104. Further, the invention can be implemented in an incremental manner, since the nodes that have not been incorporated with the changes can work in conformity with those that have been incorporated with the changes.

Although the invention has been discussed with respect to specific embodiments thereof, these embodiments are merely illustrative, and not restrictive, of the invention.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In the description herein for embodiments of the present invention, a portion of the disclosure recited in the specification may contain material which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

'Computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method for determining a path maximum transmission unit (PMTU) for an internet protocol (IP) multicast, the method comprising:

transferring packets from a source device to a plurality of destination devices in a network using the IP multicast, wherein a rate for message generation returned from intermediate nodes coupled between the source device and at least one of the plurality of destination devices is controlled, wherein a first of the intermediate nodes is in a first path of the IP multicast to at least one of the plurality of destination devices, and wherein a second of the intermediate nodes is in a second path of the IP multicast to at least one of the plurality of destination devices;

receiving a message in the source device, the message being sent from the first intermediate node and at less than or equal to the controlled rate, and in response to a packet transmitted from the source device and received in the first intermediate node having a size greater than a maximum transmission unit (MTU) of a link in the first path and a don't fragment (DF) bit being set in the packet, the DF bit being set by the source device, the link comprising a connection to the first intermediate node in the first path of the IP multicast, wherein a corresponding generation of the message is suppressed and the packet is dropped in the second path by the second intermediate node; and determining the PMTU of a multicast distribution tree for the IP multicast, the multicast distribution tree comprising a set of paths from the source device to the plurality of destination devices and along which the packet is delivered to the plurality of destination devices, the set of paths comprising the first and second paths.

2. The method of claim 1, wherein the determining the PMTU of the multicast distribution tree comprises:

generating multicast probe packets by the source device at pre-defined time intervals, the multicast probe packets comprising packets of a certain size and having a DF bit set;

sending a first multicast probe packet to each path in the set of paths for the multicast distribution tree;

receiving the message at the source device and from a router in the multicast distribution tree if the first multicast probe packet has a size greater than the MTU of a link in a path of the multicast distribution tree;

generating a second multicast probe packet of smaller size than the first multicast probe packet, and repeating this process until the source device stops receiving the message from the router; and labeling the size of the second multicast probe packet when the second multicast probe packet does not return the message for each path as its PMTU.

3. The method of claim 2, further comprising calculating a time-to-live (TTL) value difference of the message, the TTL value difference comprising hop counts of the message received at the source device from the router, the hop counts comprising a number of links traversed by the message before reaching the source device.

4. The method of claim 3, further comprising retaining the PMTU of any path if the TTL value difference of the message from that path is less than a pre-defined value and the PMTU is more than a pre-defined PMTU value.

5. The method of claim 4, further comprising calculating the PMTU of the multicast distribution tree as the minimum of a retained PMTU of the set of paths from the source device to the plurality of destination devices in the multicast distribution tree.

6. The method of claim 4, further comprising logging a PMTU which is less than the pre-defined PMTU value.

7. The method of claim 1, wherein the message comprises an Internet Control Message Protocol (ICMP) message.

8. The method of claim 1, wherein the controlled rate for message generation comprises a number of messages per unit time.

9. The method of claim 1, wherein the message is received in the source device from only those destination devices that are sending/receiving packets in the multicast distribution tree at a pre-defined rate.

10. A system for determining a path maximum transmission unit (PMTU) for an internet protocol (IP) multicast, the system comprising:

means for transferring packets from a source device to a plurality of destination devices in a network using the IP multicast, wherein a rate for message generation returned from intermediate nodes coupled between the source device and at least one of the plurality of destination devices is controlled, wherein a first of the intermediate nodes is in a first path of the IP multicast to at least one of the plurality of destination devices, and wherein a second of the intermediate nodes is in a second path of the IP multicast to at least one of the plurality of destination devices;

means for receiving a message in the source device, the message being sent from the first intermediate node and at less than or equal to the controlled rate, and in response to a packet transmitted from the source device and received in the first intermediate node having a size greater than a maximum transmission unit (MTU) of a link in the first path and a don't fragment (DF) bit being set in the packet, the DF bit being set by the source device, the link comprising a connection to the first intermediate node in the first path of the IP multicast, wherein a corresponding generation of the message is suppressed and the packet is dropped in the second path by the second intermediate node; and means for determining the PMTU of a multicast distribution tree for the IP multicast, the multicast distribution tree having a set of paths from the source device to the plurality of destination devices and along which the packet is delivered to the plurality of destination devices, the set of paths comprising the first and second paths.

11. A system for determining path maximum transmission unit (PMTU) for an internet protocol (IP) multicast, the internet protocol multicast enabling transfer of packets from a source device to a plurality of destination devices in a network, the system comprising:

a message rate limiter for controlling a rate for message generation from intermediate nodes coupled between the source device and at least one of the plurality of destination devices, wherein a first of the intermediate nodes is in a first path of the IP multicast to at least one of the plurality of destination devices, and wherein a second of the intermediate nodes is in a second path of the IP multicast to at least one of the plurality of destination devices;

a message receiver for receiving a message in the source device, the message being sent from the first intermediate node and at less than or equal to the controlled rate, and in response to a packet transmitted from the source device and received in the first intermediate node having a size greater than a maximum transmission unit (MTU) of a link in the first path and a don't fragment (DF) bit being set in the packet, the DF bit being set by the source device, the link comprising a connection to the first intermediate node in the first path of the IP multicast, wherein a corresponding generation of the message is suppressed and the packet is dropped in the second path by the second intermediate node; and a PMTU calculator for determining the PMTU of a multicast distribution tree for the IP multicast, the multicast distribution tree comprising a set of paths, from the source device to the plurality of destination devices, along which the packet is delivered to the plurality of destination devices, the set of paths comprising the first and second paths.

12. The system of claim 11, wherein the PMTU calculator comprises:

a probe packet generator for generating a multicast probe packet by the source device at pre-defined time intervals, the multicast probe packet comprising a packet of a certain size with a DF bit set in the packet; and a probe packet sender for sending the multicast probe packet to each path in the multicast distribution tree.

13. The system of claim 12, wherein the probe packet generator is configured to generate a multicast probe packet of a smaller size to be sent to the multicast distribution tree from which the message is received until the source device stops receiving the message.

14. The system of claim 13, wherein the message comprises an Internet Control Message Protocol (ICMP) message.

15. A method for determining a path maximum transmission unit (PMTU) for an internet protocol (IP) multicast, the IP multicast enabling transfer of packets from a source device to a plurality of destination devices in a network, the method comprising:

controlling a rate for message generation from intermediate nodes coupled between the source device and the plurality of destination devices;

selecting an intermediate node for sending a message, the selected intermediate node being coupled between the source device and at least one of the plurality of destination devices;

sending the message from the selected intermediate node and to the source device at less than or equal to the controlled rate, and in response to a packet transmitted from the source device and received in the selected intermediate node having a size greater than a maximum transmission unit (MTU) of a link in a path to at least one destination receiving the packet and a don't fragment (DF) bit being set in the packet, the DF bit being set by the source device, the link comprising a connection to the selected intermediate node in the IP multicast; and suppressing a corresponding generation of the message and dropping the packet in each non-selected intermediate node coupled between the source device and at least one of the plurality of destination devices.

16. The method of claim 15, wherein the sending the message to the source device occurs in response to a multicast probe packet being sent from the source device and received in the selected intermediate node having a size greater than the MTU of any link in a path of a multicast distribution tree, the multicast distribution tree comprising a set of paths from the source device to the plurality of destination devices along which the packet is delivered to the plurality of destination devices.

17. The method of claim 16, further comprising receiving in the multicast distribution tree from which the message is sent, successively smaller sized multicast probe packets until the source device stops receiving the message.

18. The method of claim 17, further comprising labeling a size of a first multicast probe packet that does not return the message for each path as the PMTU.

19. An apparatus for determining a path maximum transmission unit (PMTU) for an internet protocol (IP) multicast, the apparatus comprising:

a processing system including a processor coupled to a display and a user input device;

a computer-readable storage medium including instructions executable by the processor, the computer-readable storage medium comprising:

one or more instructions for transferring packets from a source device to a plurality of destination devices in a network using the IP multicast, wherein a rate for message generation returned from intermediate nodes coupled between the source device and at least one of the plurality of destination devices, wherein a first of the intermediate nodes is in a first path of the IP multicast to at least one of the plurality of destination devices is controlled, and wherein a second of the intermediate nodes is in a second path of the IP multicast to at least one of the plurality of destination devices;

one or more instructions for receiving a message in the source device, the message being sent from the first intermediate node and at less than or equal to the controlled rate, and in response to a packet transmitted from the source device and received in the first intermediate node having a size greater than a maximum transmission unit (MTU) of a link in the first path and a don't fragment (DF) bit being set in the packet, the DF bit being set by the source device, the link comprising a connection to the first intermediate node in the first path of the IP multicast, wherein a corresponding generation of the message is suppressed and the packet is dropped in the second path by the second intermediate node; and one or more instructions for determining the PMTU of a multicast distribution tree for the IP multicast, the multicast distribution tree comprising a set of paths, from the source device to the plurality of destination devices, along which the packet is delivered to the plurality of destination devices, the set of paths comprising the first and second paths.

20. A computer-readable storage medium including instructions executable by a processor, the computer-readable storage medium comprising:

one or more instructions for transferring packets from a source device to a plurality of destination devices in a network using an Internet protocol (IP) multicast, wherein a rate for message generation returned from intermediate nodes coupled between a source device and at least one of the plurality of destination devices is controlled, wherein a first of the intermediate nodes is in a first path of the IP multicast to at least one of the plurality of destination devices, and wherein a second of the intermediate nodes is in a second path of the IP multicast to at least one of the plurality of destination devices;

one or more instructions for receiving a message in the source device, the message being sent from the first intermediate node and at less than or equal to the controlled rate, and in response to a packet transmitted from the source device and received in the first intermediate node having a size greater than a maximum transmission unit (MTU) of a link in the first path and a don't fragment (DF) bit being set in the packet, the DF bit being set by the source device, the link comprising a connection to the first intermediate node in the first path of the IP multicast, wherein a corresponding generation of the message is suppressed and the packet is dropped in the second path by the second intermediate node; and one or more instructions for determining a path maximum transmission unit (PMTU) of a multicast distribution tree for the IP multicast, the multicast distribution tree being a set of paths, from the source device to a plurality of destination devices, along which the packet is delivered to the plurality of destination devices, the set of paths comprising the first and second paths.

* * * * *